US011680898B2

(12) United States Patent
Park et al.

(10) Patent No.: US 11,680,898 B2
(45) Date of Patent: Jun. 20, 2023

(54) HYBRID PROBE, PHYSICAL PROPERTY ANALYSIS APPARATUS INCLUDING THE SAME, AND METHOD OF MEASURING SEMICONDUCTOR DEVICE USING THE APPARATUS

(71) Applicant: SAMSUNG ELECTRONICS CO., LTD., Suwon-si (KR)

(72) Inventors: Junbum Park, Goyang-si (KR); Namil Koo, Hwaseong-si (KR); Inkeun Baek, Suwon-si (KR); Jongmin Yoon, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 17/183,577

(22) Filed: Feb. 24, 2021

(65) Prior Publication Data

US 2022/0011225 A1 Jan. 13, 2022

(30) Foreign Application Priority Data

Jul. 8, 2020 (KR) ........................ 10-2020-0084345

(51) Int. Cl.
  *G01N 21/3581* (2014.01)
  *H01Q 23/00* (2006.01)
  *H01Q 19/10* (2006.01)
  *H01Q 21/06* (2006.01)
  *H01Q 1/52* (2006.01)
  *G01N 21/3563* (2014.01)

(52) U.S. Cl.
  CPC ..... *G01N 21/3581* (2013.01); *G01N 21/3563* (2013.01); *H01Q 1/525* (2013.01); *H01Q 19/108* (2013.01); *H01Q 21/062* (2013.01); *H01Q 23/00* (2013.01); *G01N 2021/3568* (2013.01); *G01N 2201/061* (2013.01)

(58) Field of Classification Search
  CPC .......... G01N 21/3581; G01N 21/3563; G01N 2021/3568; G01N 2201/061; H01Q 1/525; H01Q 19/108; H01Q 21/062; H01Q 23/00
  See application file for complete search history.

(56) References Cited

U.S. PATENT DOCUMENTS

| | | | |
|---|---|---|---|
| 5,442,300 | A | 8/1995 | Nees et al. |
| 5,708,273 | A | 1/1998 | Vonbargen |
| 6,873,165 | B2 | 3/2005 | Lee et al. |
| 7,315,175 | B2 * | 1/2008 | Cole .................. G01N 21/3581 850/56 |

(Continued)

FOREIGN PATENT DOCUMENTS

| | | | |
|---|---|---|---|
| JP | 3904283 | B2 | 4/2007 |
| JP | 4031360 | B2 | 1/2008 |

(Continued)

*Primary Examiner* — David P Porta
*Assistant Examiner* — Jeremy S Valentiner
(74) *Attorney, Agent, or Firm* — Lee IP Law, P.C.

(57) ABSTRACT

A hybrid probe includes a probe body including a wiring and extending in a first direction; and a probe tip coupled to the probe body and including a first antenna, a second antenna, and an isolation layer. The hybrid probe may operate in a reflection mode using the first antenna and the second antenna, and operate in a transmission mode using the second antenna.

17 Claims, 19 Drawing Sheets

(56) References Cited

U.S. PATENT DOCUMENTS

| | | | |
|---|---|---|---|
| 7,459,687 B2* | 12/2008 | Federici | ............... G01N 21/636 |
| | | | 250/341.8 |
| 7,511,512 B2 | 3/2009 | Sekiguchi | |
| 2019/0120753 A1* | 4/2019 | Prater | ..................... H01J 37/26 |
| 2021/0336346 A1* | 10/2021 | Globisch | ................ H01Q 9/285 |

FOREIGN PATENT DOCUMENTS

| | | |
|---|---|---|
| JP | 4073603 B2 | 4/2008 |
| JP | 2008-151673 A | 7/2008 |
| JP | 4800244 B2 | 10/2011 |
| KR | 10-0434447 B1 | 6/2004 |

* cited by examiner

HYBRID PROBE, PHYSICAL PROPERTY ANALYSIS APPARATUS INCLUDING THE SAME, AND METHOD OF MEASURING SEMICONDUCTOR DEVICE USING THE APPARATUS

CROSS-REFERENCE TO RELATED APPLICATION

Korean Patent Application No. 10-2020-0084345, filed on Jul. 8, 2020, in the Korean Intellectual Property Office, and entitled: "Hybrid Probe, Physical Property Analysis Apparatus Including the Same, and Method of Measuring Semiconductor Device Using the Apparatus," is incorporated by reference herein in its entirety.

BACKGROUND

1. Field

Embodiments relate to a physical property analysis apparatus, and more particularly, to a probe for measuring a near field and a physical property analysis apparatus including the probe.

2. Description of the Related Art

With the recent rapid development of electronic engineering, several hundreds of GHz ultrahigh-speed devices have been researched and developed, and the integration density of ultrahigh-speed devices is increasing. Ultrahigh-speed and highly integrated devices/circuits may have conditions and behaviors related to unexpected electromagnetic waves therein. Thus, there is an increasing demand for a direct analysis system.

SUMMARY

Embodiments are directed to a hybrid probe, including: a probe body including a wiring and extending in a first direction; and a probe tip coupled to the probe body and including a first antenna, a second antenna, and an isolation layer. The hybrid probe may operate in a reflection mode using the first antenna and the second antenna, and operate in a transmission mode using the second antenna.

Embodiments are also directed to a physical property analysis apparatus, including: a light source configured to generate and output a beam; a hybrid probe configured to operate in one of a transmission mode and a reflection mode; a stage configured to receive thereon an object that is to be analyzed; an optical system configured to radiate the beam from the light source to the hybrid probe; and a detector configured to detect a signal generated from an infrared (IR) signal transmitted from the object. The hybrid probe may include a probe body and a probe tip, the probe body including a wiring, and the probe tip being coupled to the probe body and including an emitter antenna, a detector antenna, and an isolation layer. The physical property analysis apparatus may be configured to analyze the object using the emitter antenna and the detector antenna in the reflection mode, and analyze the object using the detector antenna in the transmission mode.

Embodiments are also directed to a method of analyzing a semiconductor device, the method including: selecting a transmission or reflection mode in a physical property analysis apparatus including a hybrid probe; setting an optical system of the physical property analysis apparatus according to the selected transmission or reflection mode; radiating a beam from a light source of the physical property analysis apparatus to the hybrid probe; and detecting a signal resulting from an infrared (IR) signal that has been reflected from or passed through the semiconductor device. The hybrid probe may include a probe body and a probe tip, the probe body including a wiring, and the probe tip being coupled to the probe body and including an emitter antenna, a detector antenna, and an isolation layer. The semiconductor device may be analyzed using the emitter antenna and the detector antenna in the reflection mode, and the semiconductor device may be analyzed using the detector antenna in the transmission mode.

BRIEF DESCRIPTION OF THE DRAWINGS

Features will become apparent to those of skill in the art by describing in detail example embodiments with reference to the attached drawings in which.

DETAILED DESCRIPTION

Figure 1A:
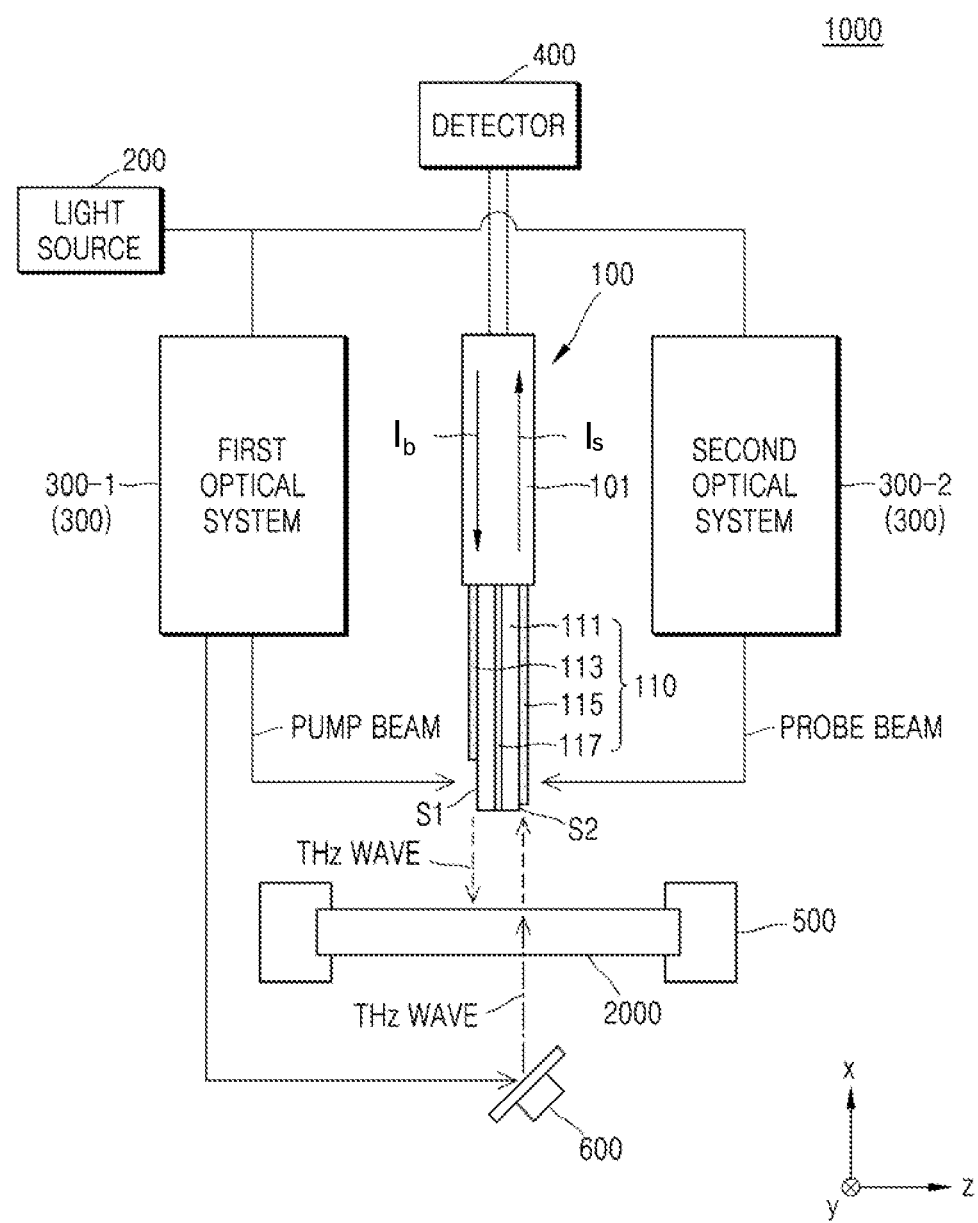
FIGS. 1A and 1B are conceptual diagrams of a physical property analysis apparatus including a hybrid probe, according to an example embodiment.
Figure 1B:
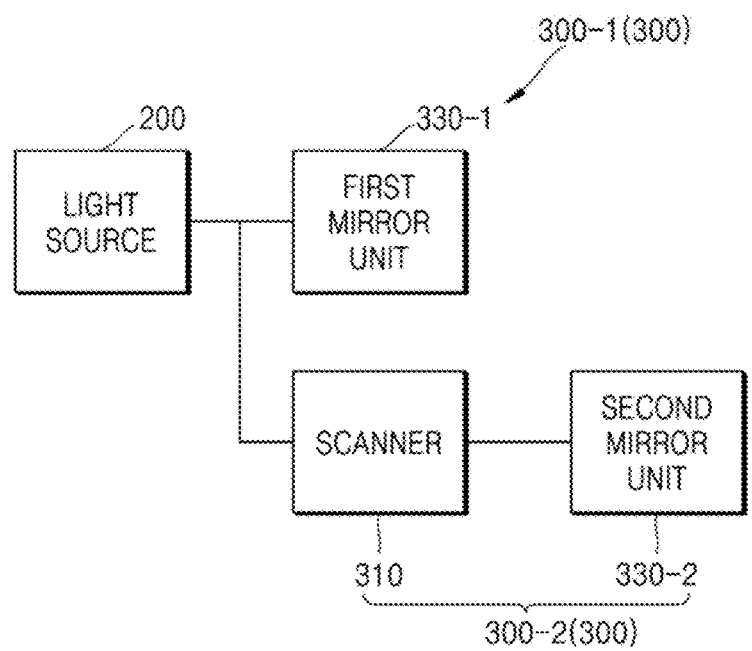
Figure 2:
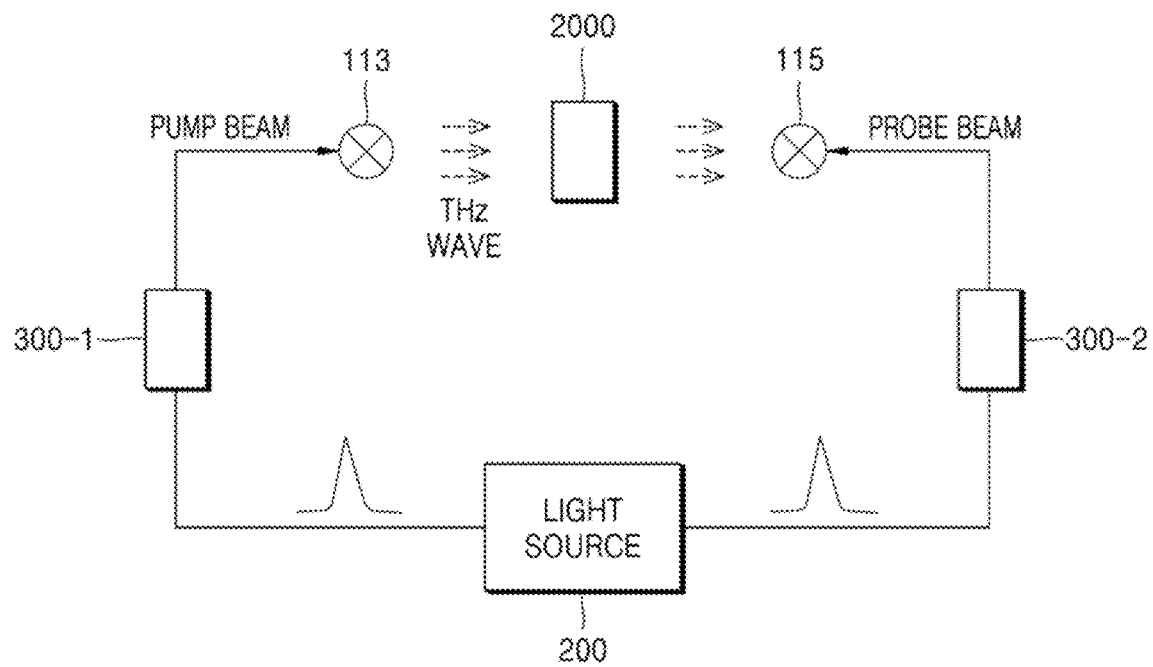
FIG. 2 is a conceptual diagram for describing the principle of measuring a semiconductor device using the physical property analysis apparatus of FIG. 1A.

FIGS. 1A and 1B are conceptual diagrams of a physical property analysis apparatus including a hybrid probe, according to an example embodiment. FIG. 2 is a conceptual diagram for describing the principle of measuring a semiconductor device using the physical property analysis apparatus of FIG. 1A. FIG. 1B is a detailed block diagram of an optical system of the physical property analysis apparatus of FIG. 1A.

Referring to FIGS. 1A through 2, a physical property analysis apparatus 1000, which includes a hybrid probe according to an example embodiment, may include a hybrid probe 100, a light source 200, an optical system 300, a detector 400, a stage 500, and a signal generator 600.

The hybrid probe 100 may include a probe body 101 and a probe tip 110. The probe body 101 may include a wiring and may extend in a first direction (e.g., an x-direction). For example, the probe body 101 may include a printed circuit board (PCB). The probe tip 110 may be coupled to an end of the probe body 101. An opposite end of the probe body 101 may be connected to the detector 400 through a wiring.

Figure 3A:
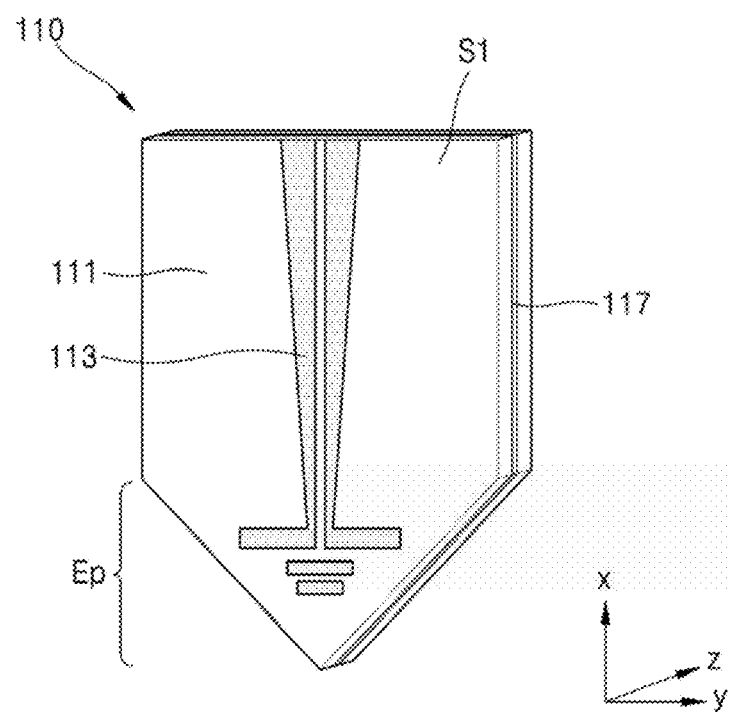
FIGS. 3A through 3C are detailed perspective views and a detailed side view of a probe tip of the hybrid probe of the physical property analysis apparatus of FIG. 1A.
Figure 3B:
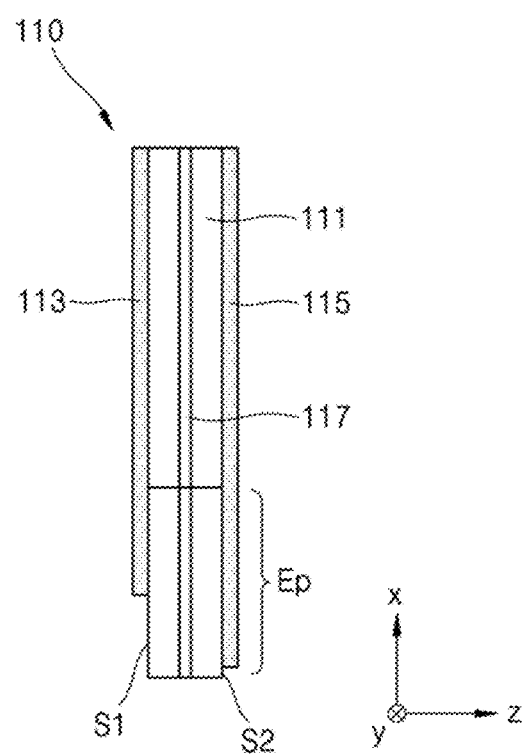
Figure 3C:
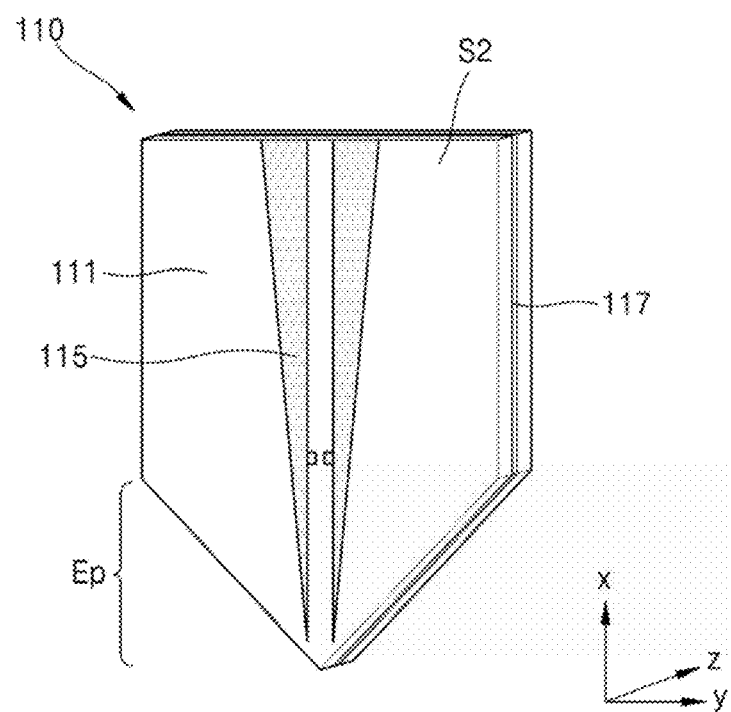

The probe tip 110 may have a flat structure extending in the first direction (e.g., the x-direction), as shown in FIGS. 3A through 3C. The probe tip 110 is not limited to the flat structure. For example, the probe tip 110 may have a quadrangular pillar shape extending in the first direction (e.g., the x-direction). The probe tip 110 may include a tapering end portion (Ep in FIG. 3A) in a lower portion thereof in the first direction (e.g., the x-direction). For convenience of description, it is assumed below that an upper portion of the probe tip 110 refers to a portion coupled to the probe body 101 and the lower portion thereof refers to an opposite portion of the upper portion.

The probe tip 110 may include a semiconductor substrate 111, an emitter antenna 113, a detector antenna 115, and an isolation layer 117. The semiconductor substrate 111 may include a low-temperature-grown (LT) gallium arsenide (GaAs) substrate or an LT-indium gallium arsenide (InGaAs) substrate. The material of the semiconductor substrate 111 is not limited to those materials. The emitter antenna 113 may be on a first surface S1 of the semiconductor substrate 111, and the detector antenna 115 may be on a second surface S2 of the semiconductor substrate 111, the second surface S2 being opposite the first surface S1.

The emitter antenna 113 and the detector antenna 115 may include metal or a semiconductor material. For example, when the emitter antenna 113 and the detector antenna 115 include metal, the emitter antenna 113 and the detector antenna 115 may include copper (Cu), or a noble metal, such as gold (Au), silver (Ag), or platinum (Pt), or the like. When the emitter antenna 113 and the detector antenna 115 include a semiconductor material, the emitter antenna 113 and the detector antenna 115 may include silicon (Si), GaAs, InGaAs, or the like.

When the emitter antenna 113 and the detector antenna 115 include metal, the emitter antenna 113 and the detector antenna 115 may have a thickness of several nm to several tens of nm, and may be formed through, e.g., vapor deposition of the metal and a lithography process. When the emitter antenna 113 and the detector antenna 115 include a semiconductor material, the emitter antenna 113 and the detector antenna 115 may have a thickness of several tens of nm to several μm, and may be formed through, e.g., epitaxial growth of the semiconductor material and a lithography process. The material, manufacturing method, and thickness of the emitter antenna 113 and the detector antenna 115 are not limited to those described above.

The isolation layer 117 may be interposed in the semiconductor substrate 111, thereby separating the semiconductor substrate 111 into two sections. For example, the isolation layer 117 may have substantially the same flat shape as the semiconductor substrate 111. The isolation layer 117 may be interposed in a middle portion of the semiconductor substrate 111 in a third direction (e.g., a z-direction) that is perpendicular to the first surface S1 of the semiconductor substrate 111.

The isolation layer 117 may block cross-talk noise between the emitter antenna 113 and the detector antenna 115. The isolation layer 117 may block electromagnetic signals from each of the emitter antenna 113 and the detector antenna 115. The electromagnetic signals may include a pulsed laser beam radiated to each of the emitter antenna 113 and the detector antenna 115, a charge carrier produced by the pulsed laser beam, a near field, or the like The isolation layer 117 may include a material or structure for blocking electromagnetic signals. The isolation layer 117 may include a material or structure reflecting an electromagnetic signal or a material or structure having a high absorption rate of electromagnetic signals in a visible wavelength range or an infrared (IR) wavelength range, e.g., a THz-wave range. For example, the isolation layer 117 may include a reflecting structure or an absorbing structure based on at least one selected from metal and a dielectric. Here, the reflecting structure or the absorbing structure may include a single-layer structure or a multi-layer structure. For example, when the isolation layer 117 includes a reflecting structure based on metal such as noble metal or copper, the isolation layer 117 may have a thin single-layer structure. When the isolation layer 117 includes a reflecting structure based on metal and a dielectric, the isolation layer 117 may have a multi-layer structure like the Mo/Si multi-layer structure of an extreme ultraviolet (EUV) mask. When the isolation layer 117 includes an absorbing structure based on metal and a dielectric, the isolation layer 117 may have a multi-layer structure including micropatterns effectively absorbing electromagnetic signals in a certain wavelength range.

The probe tip 110 having a structure in which the isolation layer 117 is interposed in the semiconductor substrate 111 may be manufactured as described below. A material layer for an antenna may be formed in each of two semiconductor substrates 111 through the vapor deposition of metal or epitaxial growth. Thereafter, an emitter antenna and a detector antenna, which have a desired shape, may be formed through a lithography process. Thereafter, the probe tip 110 may be manufactured by bonding the semiconductor substrates 111 to each other with the isolation layer 117 therebetween. When the semiconductor substrate 111 is based on GaAs or InGaAs and is mechanically cut into the shape shown in FIG. 3A, the semiconductor substrate 111 may be easily broken. Therefore, the probe tip 110 may be reliably manufactured by cutting the semiconductor substrate 111 using an etching process.

According to the present example embodiment, the hybrid probe 100 of the physical property analysis apparatus 1000 may be different than existing general probes, in that the probe tip 110 includes both the emitter antenna 113 and the detector antenna 115 and includes the isolation layer 117 between the emitter antenna 113 and the detector antenna 115. In the case of existing probes, a probe tip may include only one of an emitter antenna and a detector antenna on a semiconductor substrate. Accordingly, when an object is measured, the probe tip including the detector antenna needs to be used in a transmission mode and the probe tip including the emitter antenna needs to be used in a reflection mode. As described above, because different probe tips need to be used in different measurement modes, it is necessary to exchange probes. When the probes are exchanged, optical alignment needs to be performed and tool matching may also be required. Consequently, it is hard to secure consistent measurements in the measurement using existing probes, and therefore, reliability may decrease. Here, the optical alignment may include the alignment between the emitter antenna and the probe tip and the alignment of a laser emission point to the emitter antenna. The tool matching may refer to a procedure for matching signals to compare devices with each other before and after a probe exchange. In the case of an existing probe tip including an emitter antenna, two emitter antennas may be adjacent to each other on a semiconductor substrate but may be separated from each other with a relatively large gap to block cross-talk noise. Therefore, the existing probe tip including the emitter antenna may have a wide field-of-view (FOV) of about 300 μm and a resultant low resolution. In addition, the existing probe tip including the emitter antenna does not include another element for blocking cross-talk noise and may thus have a low SNR.

In contrast, the probe tip 110 of the hybrid probe 100 of the physical property analysis apparatus 1000 includes both the emitter antenna 113 and the detector antenna 115, and has a structure including the isolation layer 117 between the emitter antenna 113 and the detector antenna 115, thereby improving on existing probe structures. The specified structure of the hybrid probe 100 of the physical property analysis apparatus 1000 will be described in detail with reference to FIGS. 3A through 5 below.

The light source 200 may generate and output a beam. For example, the light source 200 may generate and output a femtosecond pulsed laser beam. The femtosecond pulsed laser beam from the light source 200 may be radiated to an end portion of each of the emitter antenna 113 and the detector antenna 115 through the optical system 300. Charge carriers having an ultra-short life may be generated from the end portion of each of the emitter antenna 113 and the detector antenna 115 through the radiation of the femtosecond pulsed laser beam.

Due to a bias current $I_b$ applied to the emitter antenna 113 and the generated charge carriers, a signal in the IR wavelength range (hereinafter, referred to as an IR signal), e.g., a THz wave, may be generated in the end portion of the emitter antenna 113 and radiated to an object 2000 to be measured, as shown in FIG. 1A. The IR signal may be reflected from the object 2000, and a signal generated by the reflection may be detected through the detector antenna 115. In detail, due to charge carriers generated in the end portion of the detector antenna 115 and the reflection of the IR signal, a signal current $I_s$ may be generated in the end portion of the detector antenna 115, transmitted from the detector antenna 115 to the detector 400, and detected by the detector 400. The generation of charge carriers through the radiation of a femtosecond pulsed laser beam and the generation of the signal current $I_s$ will be described in detail with reference to FIG. 2 below.

The optical system 300 may transmit a beam from the light source 200 to the emitter antenna 113 and the detector antenna 115. The optical system 300 may include a first optical system 300-1, which transmits a beam from the light source 200 to the emitter antenna 113, and a second optical system 300-2, which transmits the beam from the light source 200 to the detector antenna 115. The first optical system 300-1 and the second optical system 300-2 may respectively include a first mirror unit 330-1 and a second mirror unit 330-2, as shown in FIG. 1B. The second optical system 300-2 may further include a scanner 310, which delays the radiation of a beam to the detector antenna 115, for high-speed sampling in the detector antenna 115. The scanner 310 may be referred to as an optical delay line and located at the front end of the second mirror unit 330-2.

Figure 12A:
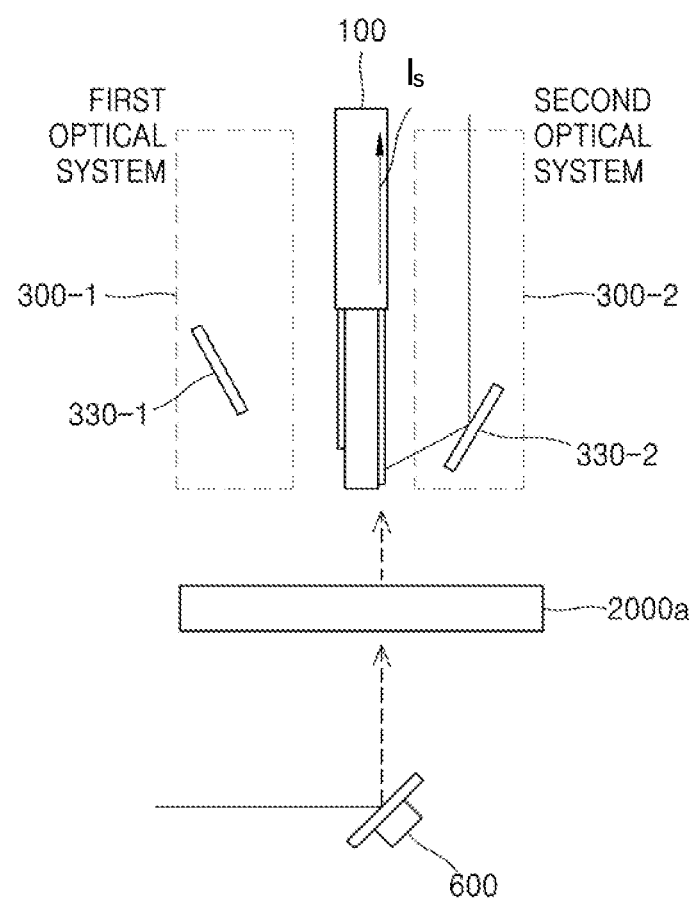
FIGS. 12A and 12B are conceptual diagrams for respectively describing the measurement in the transmission mode and the measurement in the reflection mode respectively corresponding to FIGS. 11A and 11B.
Figure 12B:
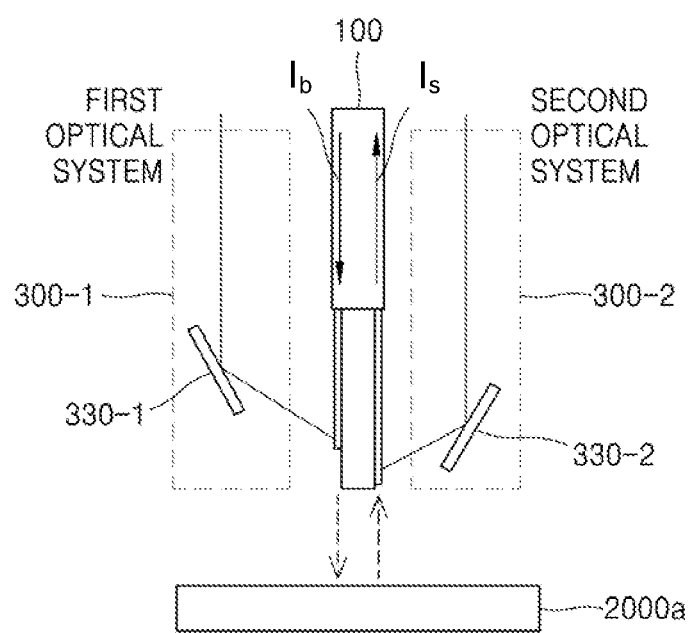
Figure 12B:
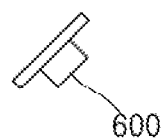

The first mirror unit 330-1 may radiate a pump beam to the emitter antenna 113, and the second mirror unit 330-2 may radiate a probe beam to the detector antenna 115. The pump beam and the probe beam will be described in detail with reference to FIG. 2 below. Each of the first mirror unit 330-1 and the second mirror unit 330-2 may include at least one mirror. For example, as shown in FIGS. 12A and 12B, each of the first mirror unit 330-1 and the second mirror unit 330-2 may include one mirror. However, according to an example embodiment, each of the first mirror unit 330-1 and the second mirror unit 330-2 may include at least two mirrors.

A beam from the light source 200 may be transmitted to the first mirror unit 330-1 or the scanner 310 through optical fiber. According to an embodiment, the optical system 300 may further include a diffractive element. The diffractive element may separate light from the light source 200 into a spectrum such that a beam only in a particular wavelength range is radiated to the emitter antenna 113 and the detector antenna 115.

The detector 400 may be connected to the hybrid probe 100 through a wiring. The detector 400 may apply the bias current $I_b$ to the emitter antenna 113. The detector 400 may also detect the signal current $I_s$ generated in the detector antenna 115. The signal current $I_s$ detected by the detector 400 may be converted into a voltage and compared with reference voltages to be used to analyze the physical property of the object 2000.

The stage 500 may support and fix the object 2000. For example, the stage 500 may fix the object 2000 by supporting the sides of the object 2000. The stage 500 may move in three dimensions. With the movement of the stage 500, the object 2000 may also move along the stage 500. For example, through the movement of the stage 500, the object 2000 may maintain a certain distance from the hybrid probe 100 in the first direction (e.g., the x-direction), and a y-z plane scan or the like may be performed on the object 2000.

The object 2000 under analysis may be, e.g., a semiconductor device such as a mask or a wafer. The object 2000 is not limited to the semiconductor device. The semiconductor device as the object 2000 may include a micropattern. The semiconductor device may also include multiple material layers. In general, a semiconductor device may refer to an individual chip resulting from singulation of a wafer or a package of the chip. Hereinafter, the concept of a semiconductor device may include all of an individual chip, a mask, a wafer before singulation, and the like. According to the present example embodiment, the physical property analysis apparatus 1000 may detect a near field and a resultant signal using the hybrid probe 100 to measure and analyze various physical properties of the object 2000. For example, the physical property analysis apparatus 1000 may analyze the quality or structure of material layers of the object 2000. The physical property analysis apparatus 1000 may also analyze an optical constant, such as a refractive index, n, or a permittivity, k, of a material layer of the object 2000, or may detect impurities in a material layer and analyze a quality of the material layer.

The signal generator 600 may generate and emit an IR signal to the object 2000. For example, the signal generator 600 may include an antenna having a similar structure to the emitter antenna 113. Accordingly, a femtosecond pulsed laser beam may be radiated to the signal generator 600 through the first optical system 300-1, and the signal generator 600 may generate an IR signal, e.g., a THz wave. As shown in FIG. 1A, the THz wave from the signal generator 600 may be emitted to the object 2000, and a signal resulting from the THz wave that has passed through the object 2000 may be detected through the detector antenna 115. Thus, the signal current $I_s$ may be generated in the end portion of the detector antenna 115 due to charge carriers generated in the end portion of the detector antenna 115 and the transmission of the IR signal, and then transmitted to the detector 400 through the detector antenna 115 and detected by the detector 400.

The principle of measuring a semiconductor device using the physical property analysis apparatus 1000 will be described with reference to FIG. 2 below.

Referring to FIG. 2, a femtosecond pulsed laser beam from the light source 200 may be split into a pump beam and a probe beam by a beam splitter or the like. The pump beam may be radiated to the end portion of the emitter antenna 113, to which the bias current $I_b$ is applied, through the first optical system 300-1. Through the radiation of the pump beam, charge carriers may be generated in the end portion of the emitter antenna 113, and electromagnetic radiation in the differential form of the charge carriers, i.e., an IR signal, may be generated. The IR signal may be incident to the object 2000 and may then be reflected from or pass through the object 2000. FIG. 2 shows the case where the signal passes through the object 2000.

A probe beam may be radiated to the end portion of the detector antenna 115 through the second optical system 300-2. The probe beam may be radiated to the end portion of the detector antenna 115 via the scanner 310 of the second optical system 300-2, and thus may be delayed compared to the pump beam. Through the radiation of the probe beam, charge carriers may be generated in the end portion of the detector antenna 115. However, an IR signal may not be generated because of the structure of the detector antenna 115.

When the object 2000 is between the emitter antenna 113 and the detector antenna 115, the signal current $I_s$ (which is generated by the interaction between an IR signal that has passed through the object 2000 and charge carriers) may be detected through the detector antenna 115. The signal current $I_s$ may correspond to the impulse response of the object 2000, and may include information about a cross-correlation between a signal to be measured and a charge carrier for sampling by the detector antenna 115 with respect to a time delay between a pump beam and a probe beam. Thus, the detector antenna 115 may sample a charge carrier proportional to a signal to be measured at each time delay of the emitter antenna 113 such that the sampled charge carrier is detected as the signal current $I_s$. Accordingly, when the signal current $I_s$ is detected through the detector antenna 115, electrical characteristics of the object 2000 and corresponding physical properties thereof may be analyzed.

The principle of detecting a signal current, which results from a THz wave that has passed through the object 2000, through the detector antenna 115, i.e., a measuring principle in the transmission mode, has been described with reference to FIG. 2. A measuring principle in the reflection mode may be substantially the same as the measuring principle in the transmission mode, except that the THz wave is reflected from the object 2000 instead of passing through the object 2000.

Because the probe tip 110 of the hybrid probe 100 includes both the emitter antenna 113 and the detector antenna 115, the physical property analysis apparatus 1000 may perform measurement in both the transmission mode and the reflection mode for the object 2000. Accordingly, the physical property analysis apparatus 1000 does not require a probe exchange and an optical alignment involved in the exchange at conversion between the transmission mode and the reflection mode, and may allow tool matching to be easily performed. Consequently, the physical property analysis apparatus 1000 may secure constancy in measurement of the object 2000 based on the hybrid probe 100, thereby increasing reliability.

In addition, because the emitter antenna 113 and the detector antenna 115 are separated from each other by a very narrow gap with the semiconductor substrate 111 therebetween in the structure of the probe tip 110 of the hybrid probe 100, the physical property analysis apparatus 1000 may secure a high resolution at a narrow FOV of 10 μm or less. In addition, the physical property analysis apparatus 1000 may provide a high SNR by effectively blocking cross-talk noise between the emitter antenna 113 and the detector antenna 115 using the isolation layer 117 in the semiconductor substrate 111. Consequently, the physical property analysis apparatus 1000 may further increase the reliability in the measurement of the object 2000 based on the hybrid probe 100.

Figure 4A:
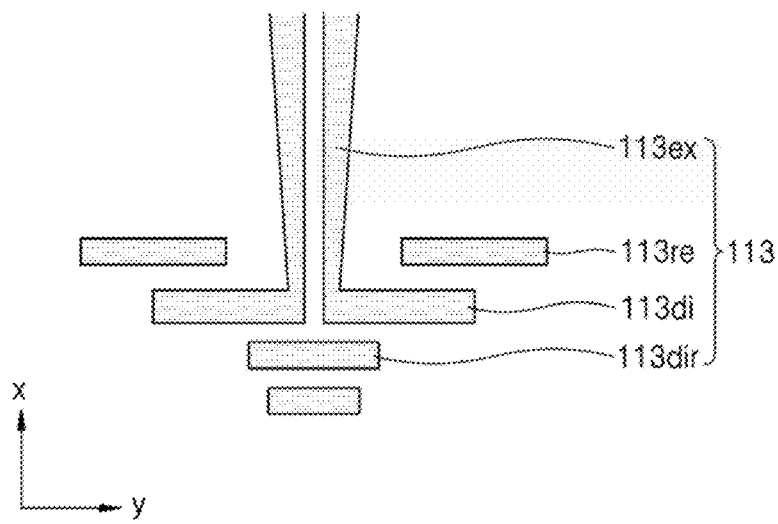
FIGS. 4A and 4B are respective detailed plan views of an emitter antenna and a detector antenna of the probe tip of FIGS. 3A and 3C.
Figure 4B:
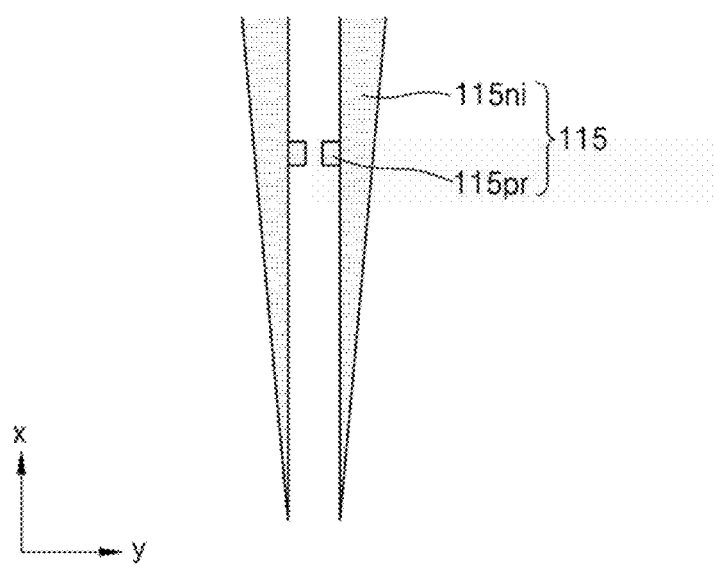

FIGS. 3A through 3C are detailed perspective views and a detailed side view of a probe tip of the hybrid probe of the physical property analysis apparatus of FIG. 1A. FIGS. 4A and 4B are respective detailed plan views of an emitter antenna and a detector antenna of the probe tip of FIGS. 3A and 3C. FIG. 1A is also referred to, and redundant descriptions that have been made with reference to FIGS. 1A through 2 are briefly given or omitted.

FIGS. 3A through 4B show only the probe tip 110 of the hybrid probe 100 of the physical property analysis apparatus 1000. As described above, the probe tip 110 may include the semiconductor substrate 111, the emitter antenna 113 on the first surface 51 of the semiconductor substrate 111, the detector antenna 115 on the second surface S2, and the isolation layer 117 interposed in the semiconductor substrate 111.

As described above, the semiconductor substrate 111 may have a flat shape extending in the first direction (e.g., the x-direction) and may have the end portion Ep tapering in the lower portion thereof in the first direction (e.g., the x-direction). For example, as shown in FIG. 3A or 3C, the semiconductor substrate 111 may have a flat shape, which is wide in the first direction (e.g., the x-direction) and in a second direction (e.g., a y-direction) and narrow in the third direction (e.g., the z-direction). Both sides of the end portion Ep in the second direction (e.g., the y-direction) may be closer to each other toward the lower portion of the end portion EP in the first direction (e.g., the x-direction) and meet each other at the end of the end portion Ep.

As shown in FIG. 4A, the emitter antenna 113 may include a dipole unit 113*di*, a director 113*dir*, an extension 113*ex*, and a reflector 113*re*. The dipole unit 113*di* may be arranged on the end portion Ep of the probe tip 110 and may include two first conductive lines separated from each other in the second direction (e.g., the y-direction). Each of the first conductive lines may extend in the second direction (e.g., the y-direction). The dipole unit 113*di* may perform radiation in an IR wavelength range, that is, the dipole unit 113*di* may generate an IR signal.

The director 113*dir* may be arranged below the dipole unit 113*di* in the first direction (e.g., the x-direction) and may include at least two second conductive lines separated from each other in the first direction (e.g., the x-direction). However, according to an example embodiment, the director 113*dir* may include one second conductive line. Each of the second conductive lines may extend in the second direction (e.g., the y-direction). The length of each of the second conductive lines in the second direction (e.g., the y-direction) may decrease as each second conductive line is closer to the end of the end portion Ep of the probe tip 110. The director 113*dir* may direct the IR signal generated by the dipole unit 113*di* downwards from the probe tip 110 in the first direction (e.g., the x-direction). Thus, the director 113*dir* may direct the IR signal to the object 2000 below the probe tip 110.

The extension 113*ex* may extend from the first conductive lines to the probe body 101 in the first direction (e.g., the x-direction) and be connected to a wiring of the probe body 101. The extension 113*ex* may include two third conductive lines respectively corresponding to two first conductive lines. Two third conductive lines may be separated from each other in the second direction (e.g., the y-direction). As described above, the bias current $I_b$ is applied to the emitter antenna 113. The extension 113*ex* may be a path for transmitting the bias current $I_b$ to the dipole unit 113*di*.

The reflector 113*re* may be arranged above the dipole unit 113*di* in the first direction (e.g., the x-direction). The reflector 113*re* may include two fourth conductive lines respectively corresponding to two first conductive lines. Two fourth conductive lines may be respectively at both sides of the extension 113*ex* in the second direction (e.g., the y-direction). The reflector 113*re* may reflect the IR signal generated by the dipole unit 113*di* such that the IR signal heads downwards from the probe tip 110 in the first direction (e.g., the x-direction). Thus, the reflector 113*re* may reflect the IR signal, which heads upwards from the probe tip 110 in the first direction (e.g., the x-direction), to the object 2000 below the probe tip 110. According to an embodiment, the reflector 113*re* may be omitted.

Referring to FIG. 4B, the detector antenna 115 may include two needles 115*ni* separated from each other in the second direction (e.g., the y-direction). Each of the needles 115*ni* may extend in the first direction (e.g., the x-direction) and may have a pointed shape tapering toward the end of the end portion Ep of the probe tip 110. The needles 115*ni* may extend to the probe body 101 and be connected to a wiring of the probe body 101. The detector antenna 115 may also include a protrusion 115*pr* protruding from each of the needles 115*ni*. The protrusion 115*pr* may reduce the gap between the needles 115*ni* to decrease sampling. According to an example embodiment, the protrusion 115*pr* may be omitted.

The isolation layer 117 may have substantially the same flat shape as the semiconductor substrate 111. For example, the isolation layer 117 may have a flat shape, which is wide in the first direction (e.g., the x-direction) and in the second direction (e.g., the y-direction) and narrow in the third direction (e.g., the z-direction). In addition, the isolation layer 117 may have a tapering shape in the lower portion thereof in the first direction (e.g., the x-direction) in correspondence to the end portion Ep of the semiconductor substrate 111. The isolation layer 117 may have a very narrow width in the third direction (e.g., the z-direction) compared to the semiconductor substrate 111. The isolation layer 117 may be interposed in the middle portion of the semiconductor substrate 111 in the third direction (e.g., the z-direction) and thus separate the semiconductor substrate 111 into two sections. As described above, the isolation layer 117 may block cross-talk noise between the emitter antenna 113 and the detector antenna 115.

Figure 5:
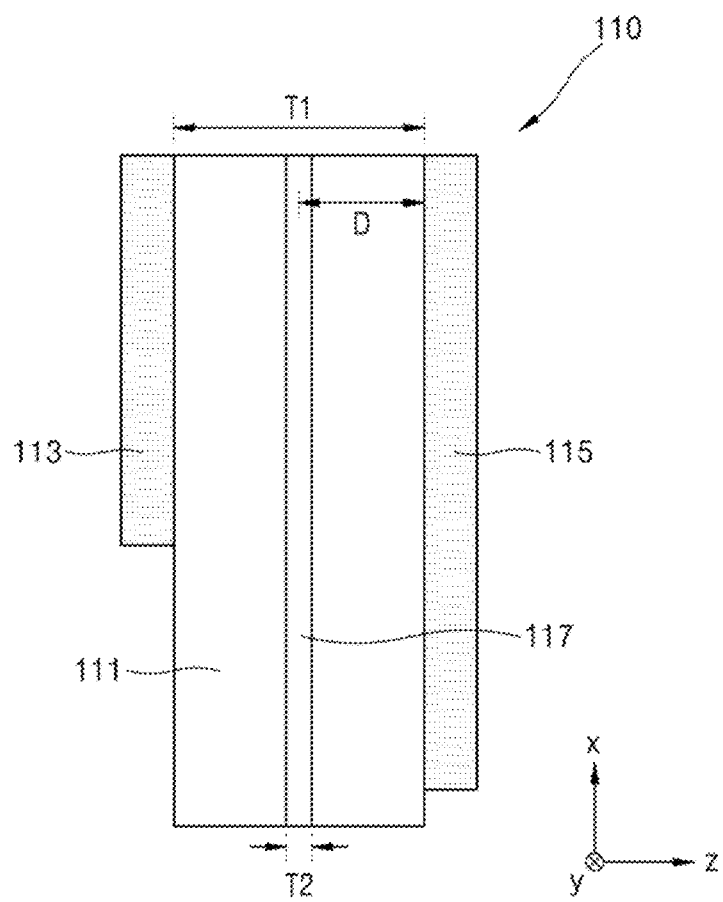
FIG. 5 is a side view for describing the position and structure of an isolation layer of a semiconductor substrate in the probe tip of FIG. 3A.

FIG. 5 is a side view for describing the position and structure of an isolation layer of a semiconductor substrate in the probe tip of FIG. 3A.

Referring to FIG. 5, the semiconductor substrate 111 of the physical property analysis apparatus 1000 may include GaAs or InGaAs. The semiconductor substrate 111 may have a first thickness T1 in the third direction (e.g., the z-direction) of, e.g., about 3 μm. The first thickness T1 is not limited to 3 μm. In FIG. 5, D may denote a distance from the detector antenna 115 to the middle portion, e.g., the center, of the semiconductor substrate 111 in the third direction (e.g., the z-direction).

The isolation layer 117 may be inserted into the middle portion of the semiconductor substrate 111 in the third direction (e.g., the z-direction). The isolation layer 117 may include metal, e.g., Cu. The material of the isolation layer 117 is not limited to Cu. The isolation layer 117 may have a second thickness T2 in the third direction (e.g., the z-direction). For example, the second thickness T2 may be at least 70 nm. However, the second thickness T2 is not limited to 70 nm. For example, the thickness of the isolation layer 117 may vary with whether the isolation layer 117 includes a reflecting structure or an absorbing structure, the material of the isolation layer 117, or whether the isolation layer 117 has a multi-layer structure or a single-layer structure.

In the physical property analysis apparatus 1000, the emitter antenna 113 and the detector antenna 115 may be formed based on a semiconductor such as GaAs or InGaAs. Accordingly, the emitter antenna 113 and the detector antenna 115 may have a thickness of about 1 μm in the third direction (e.g., the z-direction). However, the thickness of the emitter antenna 113 and the detector antenna 115 is not limited thereto. For example, when the emitter antenna 113 and the detector antenna 115 are formed based on metal, the emitter antenna 113 and the detector antenna 115 may be formed as thin as several nm to several tens of nm.

Figure 6A:
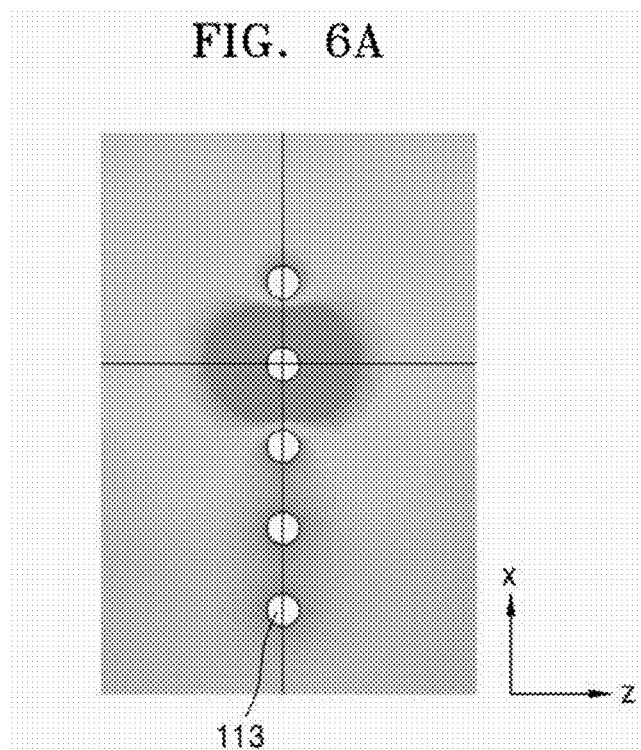
FIGS. 6A and 6B are simulation photographs for describing the cross-talk noise blocking function of an isolation layer in the probe tip of FIG. 3A.
Figure 6B:
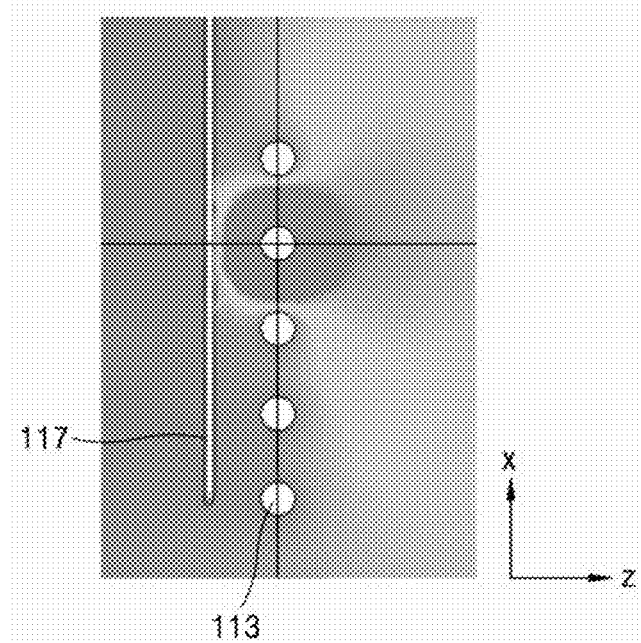

FIGS. 6A and 6B are simulation photographs for describing the cross-talk noise blocking function of an isolation layer in the probe tip of FIG. 3A. FIG. 6A is a simulation photograph of a probe tip of an existing probe that does not include an isolation layer. FIG. 6B is a simulation photograph of the probe tip of FIG. 3A.

Referring to FIGS. 6A and 6B, the simulation photographs correspond to a portion of the cross-section of the probe tip at right angles to the second direction (e.g., the y-direction), and five circles in the middle may correspond to the emitter antenna 113. For example, the topmost circle may correspond to the reflector 113*re* (in FIG. 4), the second circle may correspond to the dipole unit 113*di* (in FIG. 4), and the lower three circles may correspond to the director 113*dir* (in FIG. 4).

Referring to FIG. 6A, it may be seen that a near field, i.e., an IR signal, generated in the dipole unit 113*di* nearly symmetrically propagates in the third direction (e.g., the z-direction). Accordingly, when the detector antenna 115 is located somewhat close to the dipole unit 113*di* in the third direction (e.g., the z-direction), an IR signal generated in the dipole unit 113*di* may act as cross-talk noise to the detector antenna 115.

Referring to FIG. 6B, it may be seen that an IR signal generated in the dipole unit 113*di* is blocked by the isolation layer 117 to the left and propagates only to the right. Accordingly, when the dipole unit 113*di* and the detector antenna 115 are arranged with the isolation layer 117 therebetween, the IR signal generated in the dipole unit 113*di* may never act or may slightly act as cross-talk noise to the detector antenna 115 that is positioned, e.g., to the left of the isolation layer 117 in FIG. 6B.

Figure 7:
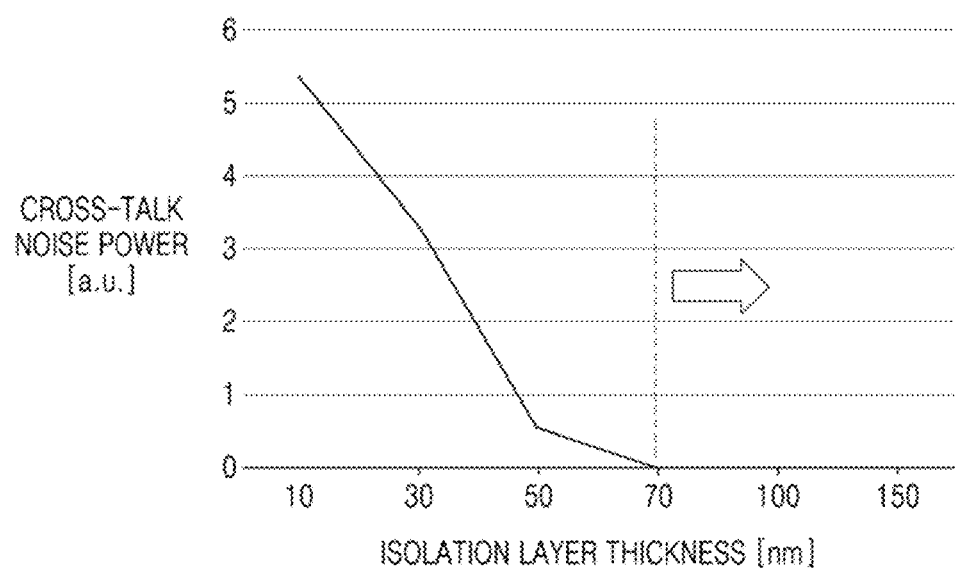
FIG. 7 is a graph showing a cross-talk noise blocking effect with respect to the thickness of an isolation layer in the probe tip of FIG. 3A.

FIG. 7 is a graph showing a cross-talk noise blocking effect with respect to the thickness of an isolation layer in the probe tip of FIG. 3A. In the graph, the x-axis is the thickness of the isolation layer 117 in the third direction (e.g., the z-direction) in units of nm, and the y-axis is cross-talk noise power in arbitrary units. Here, the isolation layer 117 may include metal such as Cu.

Referring to FIG. 7, when the thickness of the isolation layer 117 is less than 50 nm, the cross-talk noise blocking effect has a high negative slope and cross-talk noise greatly increases as the thickness decreases. When the thickness of the isolation layer 117 is greater than or equal to 50 nm and less than 70 nm, the cross-talk noise blocking effect has a low negative slope, but the cross-talk noise still increases as the thickness decreases. When the thickness of the isolation layer 117 is greater than or equal to 70 nm, the cross-talk noise is substantially 0. Accordingly, when the isolation layer 117 includes metal and has a thickness of at least 70 nm, cross-talk noise between the emitter antenna 113 and the detector antenna 115 may be substantially decreased to 0.

Figure 8A:
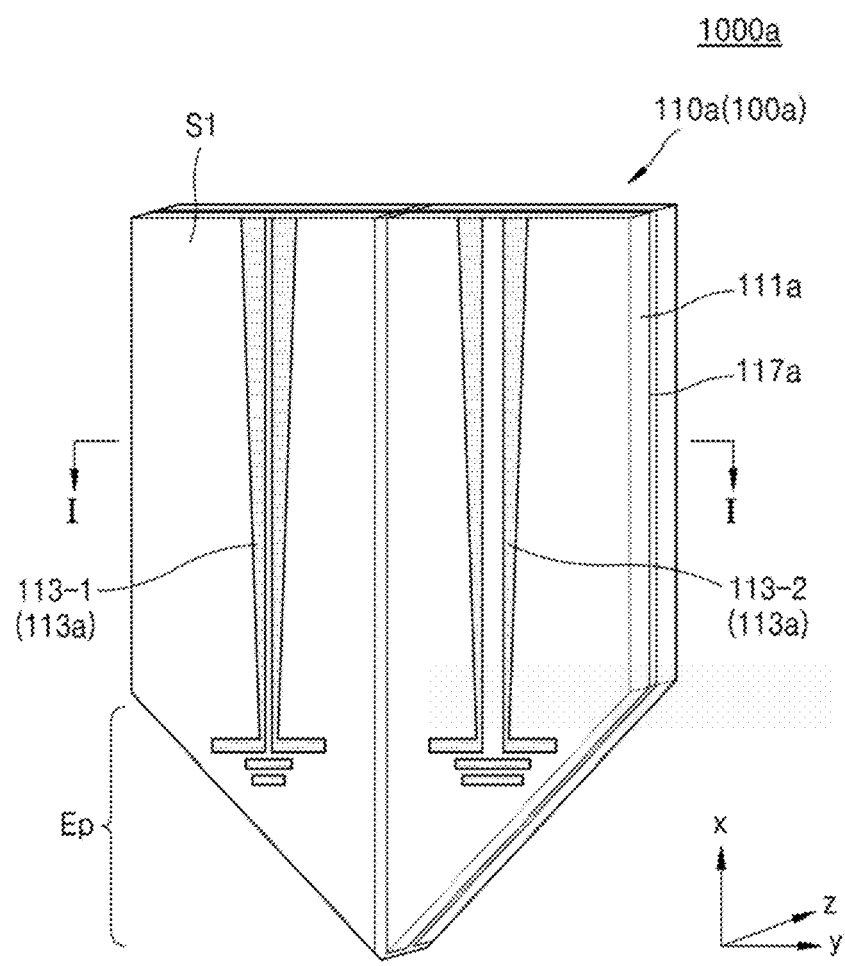
FIGS. 8A through 9C are perspective views and cross-sectional views of hybrid probes of a physical property analysis apparatus, according to embodiments.
Figure 8B:
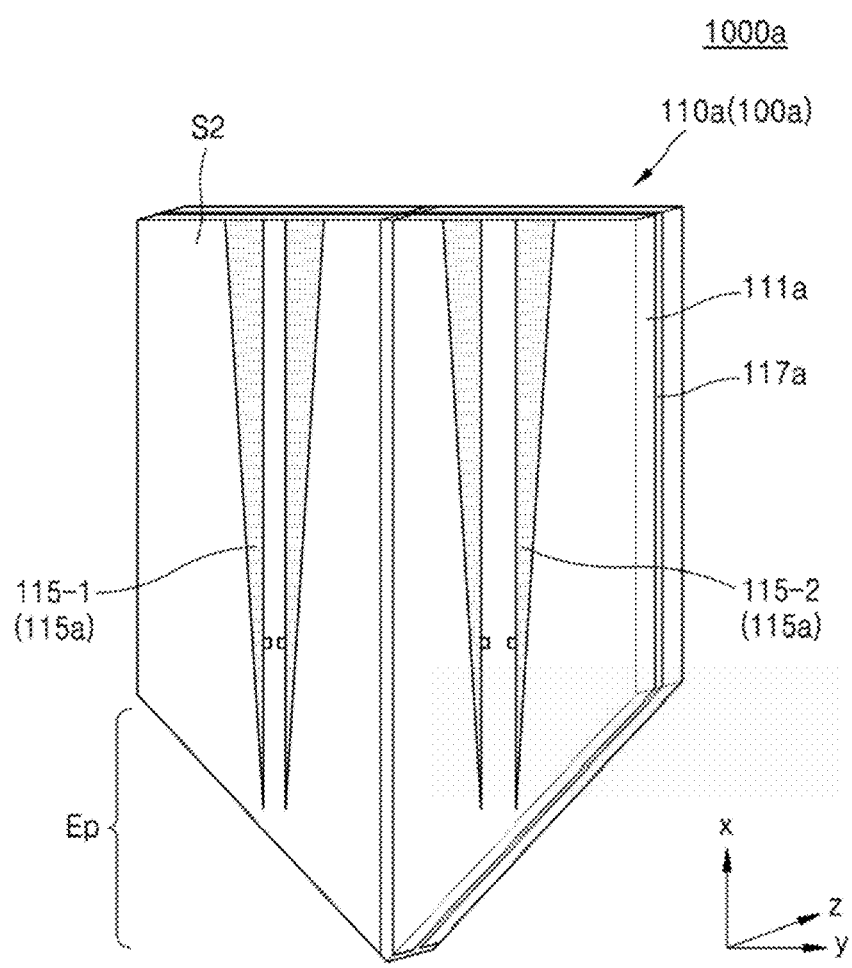
Figure 8C:
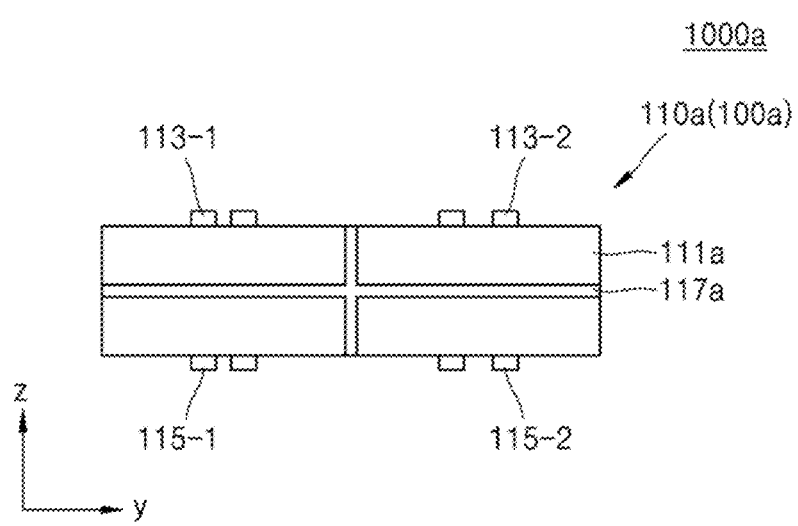
Figure 9A:
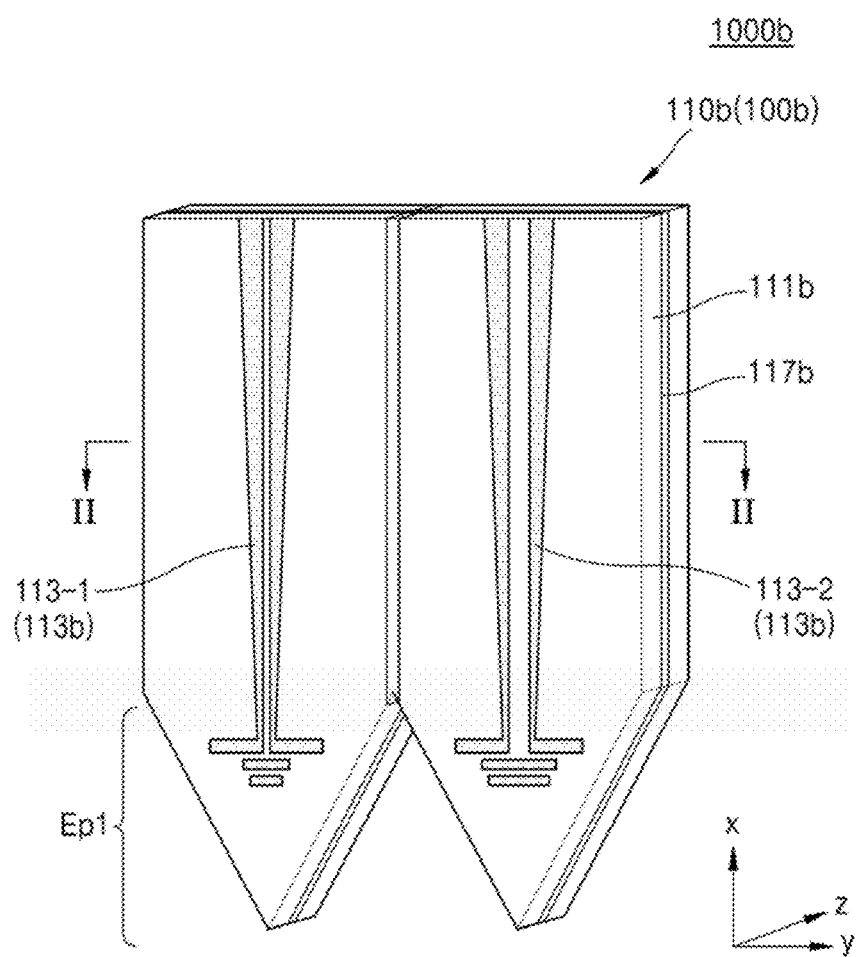
Figure 9B:
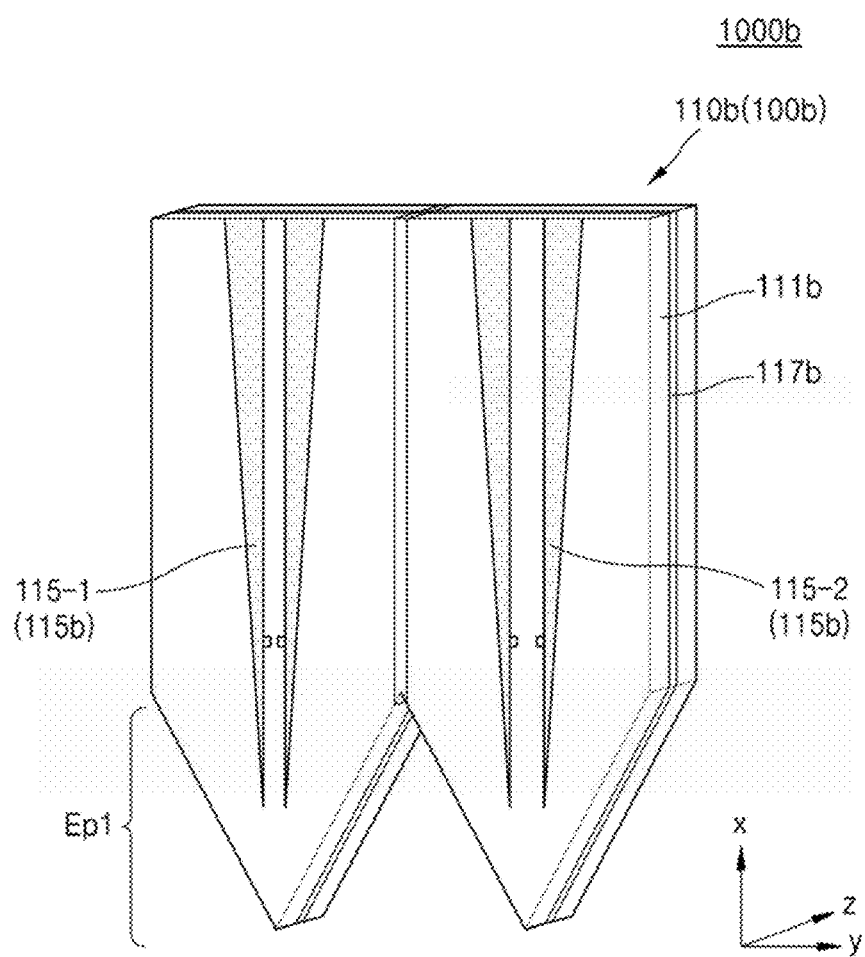
Figure 9C:
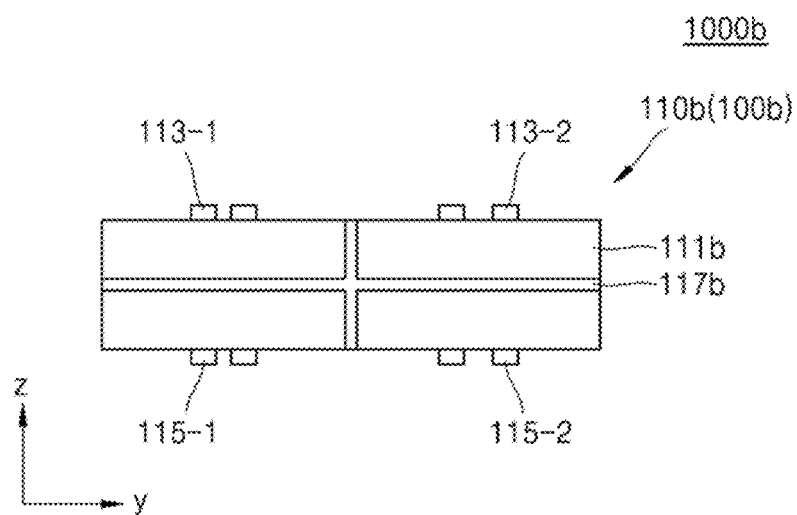

FIGS. 8A through 9C are perspective views and cross-sectional views of hybrid probes of a physical property analysis apparatus, according to example embodiments, and particularly, show probe tips. FIG. 8C is a cross-sectional view taken along line I-I' in FIG. 8A, and FIG. 9C is a cross-sectional view taken along line II-II' in FIG. 9A. Redundant descriptions that have been made with reference to FIGS. 1A through 7 are briefly given or omitted.

Referring to FIGS. 8A through 8C, a physical property analysis apparatus 1000a may be different from the physical property analysis apparatus 1000 of FIG. 1A in terms of the structure of a probe tip 110a of a hybrid probe 100a. In detail, the probe tip 110a of the hybrid probe 100a of the physical property analysis apparatus 1000a may include an emitter antenna unit 113a on the first surface S1 of a semiconductor substrate 111a and a detector antenna unit 115a on the second surface S2 of the semiconductor substrate 111a. As shown in FIGS. 8A through 8C, the emitter antenna unit 113a may include a first emitter antenna 113-1 and a second emitter antenna 113-2, which are separated from each other in the second direction (e.g., the y-direction), and the detector antenna unit 115a may include a first detector antenna 115-1 and a second detector antenna 115-2, which are separated from each other in the second direction (e.g., the y-direction).

The first emitter antenna 113-1 may have a different structure than the second emitter antenna 113-2. For example, the second emitter antenna 113-2 may have a wider gap between third conductive lines of an extension and between first conductive lines of a dipole unit in the second direction (e.g., the y-direction) than the first emitter antenna 113-1. In addition, the second emitter antenna 113-2 may have longer second conductive lines of a director in the second direction (e.g., the y-direction) than the first emitter antenna 113-1. Such structural differences between the first emitter antenna 113-1 and the second emitter antenna 113-2 are just examples, and the first emitter antenna 113-1 and the second emitter antenna 113-2 may have various structures according to the desired functions of the hybrid probe 100a. For example, the first emitter antenna 113-1 and the second emitter antenna 113-2 may have a structure allowing the hybrid probe 100a to operate as a high-resolution probe, a high-sensitivity probe, a noise suppression probe, or a broadband probe and may have different structures from each other to perform different functions. Here, the noise suppression probe may include a high-SNR probe.

The first detector antenna 115-1 may have a different structure than the second detector antenna 115-2. For example, the second detector antenna 115-2 may have a wider gap between needles in the second direction (e.g., the y-direction) than the first detector antenna 115-1. Such a structural difference between the first detector antenna 115-1 and the second detector antenna 115-2 are just examples, and the first detector antenna 115-1 and the second detector antenna 115-2 may have various structures according to the desired functions of the hybrid probe 100a. For example, the first detector antenna 115-1 and the second detector antenna 115-2 may have a structure allowing the hybrid probe 100a to operate as a high-resolution probe, a high-sensitivity probe, a noise suppression probe, or a broadband probe and may have different structures from each other to perform different functions.

An isolation layer 117a may have a structure for isolating the first and second emitter antennas 113-1 and 113-2 and the first and second detector antennas 115-1 and 115-2 from one another. For example, as shown in FIG. 8C, the cross-section of the isolation layer 117a in a direction perpendicular to the first direction (e.g., a cross-section in the y-z plane crossing the x-direction) may have a cross shape so that the isolation layer 117a separates the semiconductor substrate 111a into four sections. The first and second emitter antennas 113-1 and 113-2 and the first and second detector antennas 115-1 and 115-2 may respectively correspond to the four sections of the semiconductor substrate 111a.

When the physical property analysis apparatus 1000a measures the object 2000 in the transmission mode, one of the first and second detector antennas 115-1 and 115-2 may be used according to a desired function. When the physical property analysis apparatus 1000a measures the object 2000 in the reflection mode, one of the first and second emitter antennas 113-1 and 113-2 and one of the first and second detector antennas 115-1 and 115-2 may be used in combination according to a desired function. For example, in the reflection mode, the hybrid probe 100a may operate as one of many probes having four different functions through combinations.

The structure of the probe tip 110a, in which the semiconductor substrate 111a is separated into four sections by the isolation layer 117a and the first and second emitter antennas 113-1 and 113-2 and the first and second detector antennas 115-1 and 115-2 are respectively arranged in the four sections in the hybrid probe 100a of the physical property analysis apparatus 1000a, has been described above. However, the structure of the probe tip 110a of the hybrid probe 100a of the physical property analysis apparatus 1000a is not limited hereto. For example, the semiconductor substrate 111a may be separated into five or more sections by the isolation layer 117a. In addition, an appropriate number of emitter antennas and an appropriate number of detector antennas may be provided in correspondence to the number of sections, into which the semiconductor substrate 111a is separated by the isolation layer 117a. Accordingly, the hybrid probe 100a of the physical property analysis apparatus 1000a may operate as one of many probes having different functions in correspondence to the number of detector antennas in the transmission mode and in correspondence to a combination of the number of emitter antennas and the number of detector antennas in the reflection mode.

The number of emitter antennas may be different from the number of detector antennas. For example, the first surface S1 of the semiconductor substrate 111a may be separated into two sections by the isolation layer 117a, and the second surface S2 of the semiconductor substrate 111a may be separated into three sections by the isolation layer 117a. Two emitter antennas having a complex shape may be arranged on the first surface 51, and three detector antennas having a relatively simple shape may be arranged on the second surface S2. When two emitter antennas and three detector antennas are provided, a hybrid probe may operate as one of many probes having six different functions through a combination.

Referring to FIGS. 9A through 9C, a physical property analysis apparatus 1000b may be different from the physical property analysis apparatus 1000a of FIGS. 8A through 8C in terms of the structure of a probe tip 110b of a hybrid probe 100b.

In detail, the probe tip 110b of the hybrid probe 100b of the physical property analysis apparatus 1000b may include an emitter antenna unit 113b on the first surface S1 of a semiconductor substrate 111b and a detector antenna unit 115b on the second surface S2 of the semiconductor substrate 111b. Similarly to the probe tip 110a of the hybrid probe 100a of FIG. 8A, the emitter antenna unit 113b may include the first emitter antenna 113-1 and the second emitter antenna 113-2, which are separated from each other in the second direction (e.g., the y-direction), and the detector antenna unit 115b may include the first detector antenna 115-1 and the second detector antenna 115-2, which are separated from each other in the second direction (e.g., the y-direction).

However, as shown in FIG. 9A or 9B, the structure of the semiconductor substrate 111b of the probe tip 110b of the hybrid probe 100b may be different from the structure of the semiconductor substrate 111a of the probe tip 110a of the hybrid probe 100a of FIG. 8A. For example, an end portion Ep1 of the semiconductor substrate 111b may have a W-shape or a double-pointed shape.

The cross-section of an isolation layer 117b in a direction perpendicular to the first direction (e.g., a cross-section in the y-z plane crossing the x-direction) may have a cross shape so that the isolation layer 117b separates the semiconductor substrate 111b into four sections, and the isolation layer 117b may separate the end portion Ep1 having the W-shape in the middle of the end portion Ep1 in the second direction (e.g., the y-direction).

The cross-sectional view of FIG. 9C may be substantially the same as the cross-sectional view of FIG. 8C. If the end portion Ep1 is cut across, the cross-section of the isolation layer 117a may be different from the cross-section of the isolation layer 117b. However, even when the end portion Ep1 is cut across, the isolation layer 117a and the isolation layer 117b may be viewed from above to be substantially the same as each other.

In the probe tip 110b of the hybrid probe 100b of the physical property analysis apparatus 1000b, the first and second emitter antennas 113-1 and 113-2 may have different structures from each other, and the first and second detector antennas 115-1 and 115-2 may have different structures from each other. Therefore, through a combination, the hybrid probe 100b may perform one of two functions in the transmission mode and perform one of four functions in the reflection mode. Furthermore, the physical property analysis apparatus 1000b may have a structure of a semiconductor substrate having an end portion with at least three consecutive V-shapes and a structure of an isolation layer separating the semiconductor substrate into portions corresponding to respective V-shapes. With the structures of the semiconductor substrate and the isolation layer, at least three emitter antennas and at least three detector antennas may be arranged on the semiconductor substrate. Because of the structures of the semiconductor substrate and the isolation layer, the number of emitter antennas may be the same as the number of detector antennas. The hybrid probe 100b of the physical property analysis apparatus 1000b may operate as one of many probes having different functions in correspondence to the number of detector antennas in the transmission mode and in correspondence to a combination of the number of emitter antennas and the number of detector antennas in the reflection mode.

Figure 10:
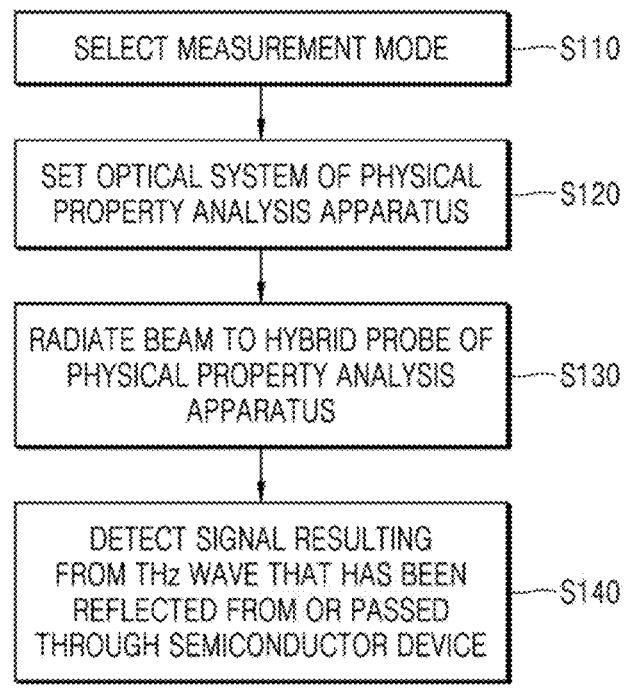
FIG. 10 is a schematic flowchart of a method of measuring a semiconductor device using a physical property analysis apparatus, according to an example embodiment.

FIG. 10 is a schematic flowchart of a method of measuring a semiconductor device using a physical property analysis apparatus, according to an example embodiment. FIG. 1A is also referred to, and redundant descriptions that have been made with reference to FIGS. 1A through 9C are briefly given or omitted.

Referring to FIG. 10, the method of measuring a semiconductor device using a physical property analysis apparatus (hereinafter, referred to as simply as the "semiconductor device measuring method") includes selecting a measurement mode of a physical property analysis apparatus in operation S110. Thus, the transmission mode or the reflection mode may be selected as the measurement mode according to a physical property to be analyzed with respect to a semiconductor device corresponding to the object 2000. For example, the transmission mode may be selected when a physical property of the inside of the semiconductor device is analyzed, and the reflection mode may be selected when a physical property of the surface of the semiconductor device is analyzed. Criteria for selecting the measurement mode are not limited thereto.

Thereafter, an optical system of the physical property analysis apparatus is set in operation S120. The physical property analysis apparatus may correspond to the physical property analysis apparatus 1000 of FIG. 1A. Accordingly, the physical property analysis apparatus 1000 may include the hybrid probe 100 including the probe tip 110 including both the emitter antenna 113 and the detector antenna 115. However, the physical property analysis apparatus is not limited to the physical property analysis apparatus 1000 of FIG. 1A. The physical property analysis apparatus 1000a or 1000b of FIG. 8A or 9A may also be used.

In an example embodiment, during the setting of the optical system 300, the first optical system 300-1 may be turned off and only the second optical system 300-2 may be turned on in the transmission mode. On the other hand, both the first optical system 300-1 and the second optical system 300-2 may be turned on in the reflection mode. According to an example embodiment, during the setting of the optical system 300, the wavelength of a beam generated by the light source 200 may be adjusted according to the reflection and/or transmission properties of the semiconductor device, or a beam having an appropriate wavelength may be selected by another optical element after being emitted from the light source 200.

A beam is radiated to the hybrid probe 100 of the physical property analysis apparatus 1000 in operation S130. For example, in the transmission mode, a probe beam may be radiated to the detector antenna 115 of the probe tip 110 of the hybrid probe 100. In the reflection mode, a pump beam may be radiated to the emitter antennas 113 of the probe tip 110 of the hybrid probe 100, and a probe beam may be radiated to the detector antenna 115 of the probe tip 110 of the hybrid probe 100.

As the beam is radiated to the hybrid probe 100, an IR signal may be generated in an end portion of the probe tip 110 of the hybrid probe 100. For example, an IR signal may be generated in the end portion of the emitter antennas 113 by the radiation of the pump beam, and an IR signal may be generated in the end portion of the detector antenna 115 by the radiation of the probe beam.

Thereafter, a signal resulting from the IR signal that has been reflected from or passed through the semiconductor device is detected through the detector antenna 115 in operation S140. For example, in the transmission mode, the signal resulting from IR signal that has passed through the semiconductor device may be detected through the detector antenna 115. In the reflection mode, the signal resulting from the IR signal that has reflected from the semiconductor device may be detected through the detector antenna 115.

According to the semiconductor device measuring method of the present example embodiment, the measurement mode may be freely selected according to a physical property of a semiconductor device to be analyzed, using the physical property analysis apparatus 1000 including the hybrid probe 100. In addition, when the measurement mode changes between the transmission mode and the reflection mode, a probe exchange and a resultant optical alignment are not required and tool matching is easily performed so that constancy is secured in the measurement of a semiconductor device. Consequently, reliability may be increased. Furthermore, based on the structural characteristics of the probe tip 110 of the hybrid probe 100, a semiconductor device may be measured with a high resolution and a high SNR, and therefore, the reliability of the measurement of the semiconductor device may be further increased.

Figure 11A:
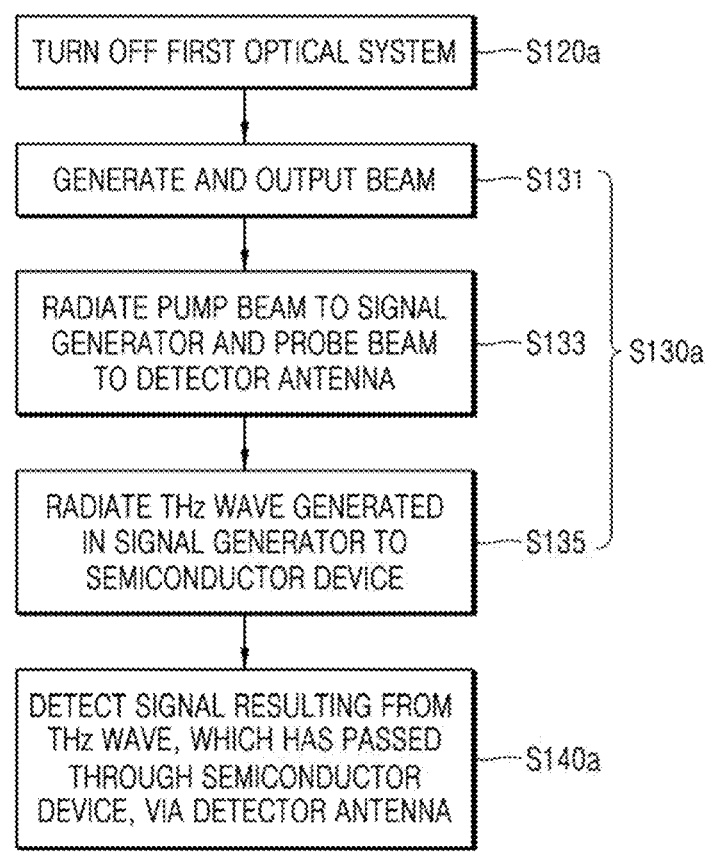
FIGS. 11A and 11B are detailed flowcharts of measurement in a transmission mode and measurement in a reflection mode in the method of FIG. 10.
Figure 11B:
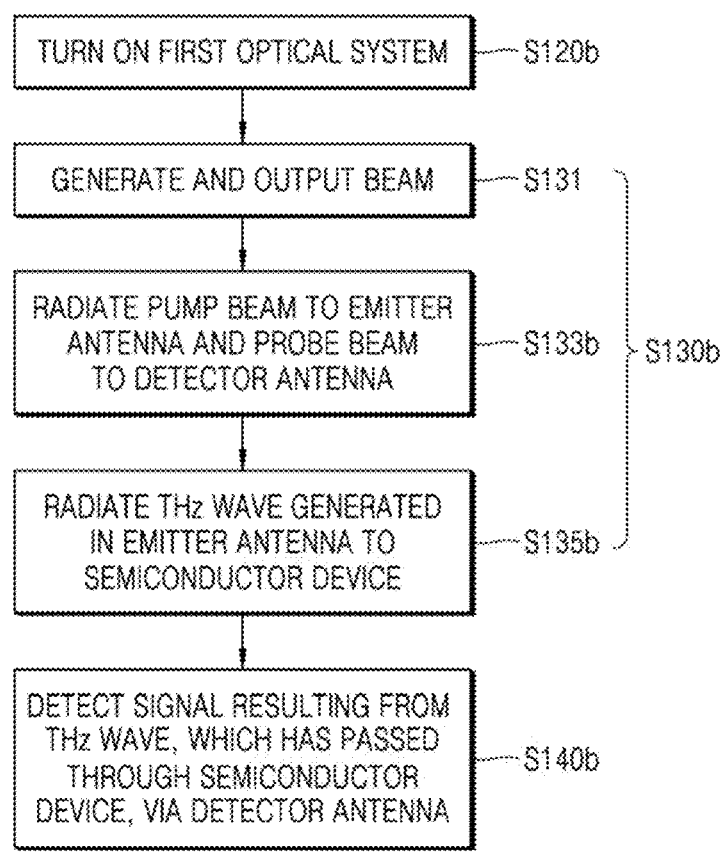

FIGS. 11A and 11B are detailed flowcharts of measurement in the transmission mode and measurement in the reflection mode in the semiconductor device measuring method of FIG. 10. FIGS. 12A and 12B are conceptual diagrams for respectively describing the measurement in the transmission mode and the measurement in the reflection mode respectively corresponding to FIGS. 11A and 11B. Redundant descriptions that have been made with reference to FIG. 10 are briefly given or omitted.

Referring to FIGS. 11A and 12A, a semiconductor device measuring method of the present example embodiment may correspond to selecting of the transmission mode in operation S110 of selecting the measurement mode. The first optical system 300-1 is turned off and only the second optical system 300-2 is maintained on in operation S120a.

Thereafter, a beam is generated and output by the light source 200 in operation S131. The beam of the light source 200 may be, for example, a femtosecond pulsed laser beam.

Thereafter, a pump beam is radiated to the signal generator 600 and a probe beam is radiated to the detector antenna 115 in operation S133. The pump beam and the probe beam may be generated by splitting the femtosecond pulsed laser beam. The probe beam may be radiated to the detector antenna 115 via the scanner 310 with a delay, compared to the pump beam.

An IR signal is generated in the signal generator 600 by the radiation of the pump beam and is radiated to a semiconductor device 2000a in operation S135.

Thereafter, a signal resulting from the IR signal that has passed through the semiconductor device 2000a may be detected through the detector antenna 115 in operation S140a. For example, the IR signal may pass through the semiconductor device 2000a, as shown in FIG. 12A, and may generate the signal current $I_s$ in the end portion of the detector antenna 115. The signal current $I_s$ may be detected by the detector 400 (in FIG. 1A) via the detector antenna 115. Meanwhile, operation S130a corresponds to operation S130 of FIG. 10, and may include operations S131, S133, and S135.

Referring to FIGS. 11B and 12B, a semiconductor device measuring method of the present example embodiment may correspond to selecting of the reflection mode in operation S110 of selecting the measurement mode. The first optical system 300-1 is turned on and the second optical system 300-2 is also maintained on in operation S120b.

Thereafter, a beam is generated and output by the light source 200 in operation S131. The beam of the light source 200 may be, for example, a femtosecond pulsed laser beam.

Thereafter, a pump beam is radiated to the emitter antenna 113 and a probe beam is radiated to the detector antenna 115 in operation S133b. In addition, the bias current $I_b$ may be applied from the detector 400 (in FIG. 1A) to the emitter antenna 113. The probe beam may be radiated to the detector antenna 115 via the scanner 310 with a delay, compared to the pump beam.

An IR signal is generated in the emitter antenna 113 by the radiation of the pump beam, and is radiated to the semiconductor device 2000a due to the physical structure of the emitter antenna 113 in operation S135b.

Thereafter, a signal resulting from the IR signal that has been reflected from the semiconductor device 2000a may be detected through the detector antenna 115 in operation S140b. For example, the IR signal may be reflected from the semiconductor device 2000a, as shown in FIG. 12B, and may generate the signal current $I_s$ in the end portion of the detector antenna 115. The signal current $I_s$ may be detected by the detector 400 via the detector antenna 115. Meanwhile, operation S130b corresponds to operation S130 of FIG. 10, and may include operations S131, S133b, and S135b.

By way of summation and review, a technique of measuring a near field with a high spatial resolution is a desirable method of efficiently performing analysis. Probes used to measure a near field may need to have a high measurement bandwidth or time resolution to measure desired frequency components, and may need to be small enough to measure an electric field at each measurement point. Furthermore, probes may need to have sufficiently high measurement sensitivity, i.e., a high signal-to-noise ratio (SNR), to perform accurate measurement with desired polarization.

As described above, embodiments may provide a hybrid probe capable of performing measurement in a transmission mode and a reflection mode without probe exchange, and capable of increasing measurement performance and reliability. Embodiments may also provide a physical property analysis apparatus including the hybrid probe, and a method of measuring a semiconductor device using the physical property analysis apparatus.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A hybrid probe, comprising:
a probe body including a wiring and extending in a first direction; and
a probe tip coupled to the probe body, the probe tip including:
a semiconductor substrate having a flat shape, a first antenna on a first surface of the semiconductor substrate, a second antenna on a second surface of the semiconductor substrate, the second surface being opposite the first surface, and an isolation layer between the first and second surfaces of the semiconductor substrate, wherein the hybrid probe operates in a reflection mode using the first antenna and the second antenna, and operates in a transmission mode using the second antenna.

2. The hybrid probe as claimed in claim 1, wherein:

the semiconductor substrate has the flat shape and an end portion, the flat shape extending in the first direction from the probe body, and the end portion having a tapering shape having a sharp point at a side opposite a portion of the probe tip coupled to the probe body, and the isolation layer separates the semiconductor substrate into at least two sections.

3. The hybrid probe as claimed in claim 2, wherein:

the first antenna is an emitter antenna and includes a dipole unit, a director, an extension, and a reflector, and the second antenna is a detector antenna and includes two needles.

4. The hybrid probe as claimed in claim 3, wherein:

the dipole unit includes two first conductive lines in the end portion, the two first conductive lines being separated from each other in a second direction that is perpendicular to the first direction, the director includes at least two second conductive lines below the dipole unit in the first direction, the at least two second conductive lines being separated from each other in the first direction and each having a length in the second direction, the length being shorter as each approaches the sharp point, the extension includes two third conductive lines extending from the first conductive lines to the wiring in the first direction, the two third conductive lines being separated from each other in the second direction, and the reflector includes two fourth conductive lines above the dipole unit in the first direction, the two fourth conductive lines being respectively at both sides of the extension in the second direction.

5. The hybrid probe as claimed in claim 3, wherein:

each of the two needles extends from the wiring to the sharp point of the end portion in the first direction, the two needles are separated from each other in a second direction that is perpendicular to the first direction, and each of the two needles includes a protrusion facing the other of the two needles in the second direction.

6. The hybrid probe as claimed in claim 2, wherein the isolation layer has a substantially same flat shape as the semiconductor substrate, is interposed in a middle portion of the semiconductor substrate in a third direction, and separates the semiconductor substrate into two sections, the third direction being perpendicular to the first surface.

7. The hybrid probe as claimed in claim 6, wherein:

the semiconductor substrate includes one of gallium arsenide (GaAs) and indium gallium arsenide (InGaAs) and has a thickness of about 3 µm, and the isolation layer includes a flat metal plate and has a thickness of at least 70 nm.

8. The hybrid probe as claimed in claim 2, wherein:

the isolation layer has a cross-shape in a cross-section that is perpendicular to the first direction, and separates the semiconductor substrate into four sections, the first antenna includes two emitter antennas on the first surface, the two emitter antennas having different structures from each other, and the second antenna includes two detector antennas on the second surface, the two detector antennas having different structures from each other.

9. The hybrid probe as claimed in claim 1, wherein the isolation layer includes one of a reflecting structure, an absorbing structure, a metal, and a dielectric.

10. A physical property analysis apparatus, comprising:

a light source configured to generate and output a beam;

a hybrid probe configured to operate in one of a transmission mode and a reflection mode;

a stage configured to receive thereon an object that is to be analyzed;

an optical system configured to radiate the beam from the light source to the hybrid probe; and a detector configured to detect a signal generated from an infrared (IR) signal transmitted from the object, wherein the hybrid probe includes a probe body and a probe tip, the probe body including a wiring, and the probe tip being coupled to the probe body, wherein the probe tip includes:

a semiconductor substrate having a flat shape, an emitter antenna on a first surface of the semiconductor substrate a detector antenna on a second surface of the semiconductor substrate, the second surface being opposite the first surface, and an isolation layer between the first and second surfaces of the semiconductor substrate, and wherein the physical property analysis apparatus is configured to analyze the object using the emitter antenna and the detector antenna in the reflection mode, and analyze the object using the detector antenna in the transmission mode.

11. The physical property analysis apparatus as claimed in claim 10, wherein:

the semiconductor substrate has the flat shape and an end portion, the flat shape extending in a first direction from the probe body, and the end portion having a tapering shape having a sharp point at a side opposite a portion of the probe tip coupled to the probe body, and the isolation layer separates the semiconductor substrate into at least two sections.

12. The physical property analysis apparatus as claimed in claim 11, wherein:

the isolation layer has a substantially same flat shape as the semiconductor substrate and separates the semiconductor substrate into two sections, the emitter antenna includes a dipole unit, a director, an extension, and a reflector, and the detector antenna includes two needles.

13. The physical property analysis apparatus as claimed in claim 11, wherein:

the isolation layer has a cross-shape in a cross-section that is perpendicular to the first direction, and separates the semiconductor substrate into four sections, two emitter antennas are arranged on the first surface and have different structures from each other, and two detector antennas are arranged on the second surface and have different structures from each other.

14. The physical property analysis apparatus as claimed in claim 10, wherein:

the isolation layer includes one of a reflecting structure, an absorbing structure, a flat metal plate, and a dielectric, and when the isolation layer includes the flat metal plate, the isolation layer has a thickness of at least 70 nm.

15. The physical property analysis apparatus as claimed in claim 10, wherein:
the light source is configured to generate and output a femtosecond pulsed laser beam, and
the optical system includes:
a scanner configured to delay the femtosecond pulsed laser beam from the light source; and
a mirror unit configured to transmit the femtosecond pulsed laser beam from one of the light source and the scanner to the hybrid probe.

16. The physical property analysis apparatus as claimed in claim 15, wherein:
the mirror unit includes a first mirror unit configured to transmit the femtosecond pulsed laser beam to the emitter antenna, and a second mirror unit configured to transmit the femtosecond pulsed laser beam to the detector antenna,
in the reflection mode, a pump beam is radiated to the emitter antenna through the first mirror unit and a probe beam is radiated to the detector antenna through the second mirror unit, and when an infrared (IR) signal is generated in the emitter antenna and radiated to the object, a signal resulting from the IR signal that has been reflected from the object is detected through the detector antenna.

17. The physical property analysis apparatus as claimed in claim 15, further comprising a signal generator arranged below the object,
wherein, in the transmission mode, a probe beam is radiated to the detector antenna through the mirror unit, and when an infrared (IR) signal is generated by the signal generator and radiated to the object, a signal resulting from the IR signal that has passed through the object is detected through the detector antenna.

* * * * *